US012371076B2

United States Patent
Das et al.

(10) Patent No.: US 12,371,076 B2
(45) Date of Patent: Jul. 29, 2025

(54) SYSTEM AND METHOD FOR IDENTIFYING CANDIDATE VEHICLE SYSTEMS

(71) Applicant: Transportation IP Holdings, LLC, Norwalk, CT (US)

(72) Inventors: Sumit Das, Bengaluru (IN); Padmaprabha Subbaraj, Bengaluru (IN)

(73) Assignee: Transportation IP Holdings, LLC, Norwalk, CT (US)

( * ) Notice: Subject to any disclaimer, the term of this patent is extended or adjusted under 35 U.S.C. 154(b) by 407 days.

(21) Appl. No.: 17/506,880

(22) Filed: Oct. 21, 2021

(65) Prior Publication Data
US 2023/0129070 A1 Apr. 27, 2023

(51) Int. Cl.
*B61L 15/00* (2006.01)
*G07C 5/00* (2006.01)
*G07C 5/08* (2006.01)

(52) U.S. Cl.
CPC ....... *B61L 15/0081* (2013.01); *B61L 15/0072* (2013.01); *G07C 5/006* (2013.01); *G07C 5/085* (2013.01)

(58) Field of Classification Search
CPC ............. B61L 15/0081; B61L 15/0072; B61L 2205/04; B61L 15/0027; B61L 27/57; G07C 5/006; G07C 5/085; G07C 5/008; H04W 4/40; G05B 23/0237; G05B 23/0283
See application file for complete search history.

(56) References Cited

U.S. PATENT DOCUMENTS

| 8,886,392 B1* | 11/2014 | Maeng | G07C 5/085 |
| | | | 701/34.2 |
| 2003/0182057 A1* | 9/2003 | Burt | G08G 1/20 |
| | | | 342/357.31 |
| 2016/0104123 A1 | 4/2016 | Viswanath et al. | |
| 2018/0222502 A1 | 8/2018 | Paralikar et al. | |

(Continued)

FOREIGN PATENT DOCUMENTS

| EP | 3623256 A1 * | 3/2020 | .......... B61L 15/0081 |
| WO | 2018119423 A1 | 6/2018 | |

OTHER PUBLICATIONS

Extended EP Search Report for related EP App. No. 22196593.2 dated Mar. 20, 2023 (10 pages).

*Primary Examiner* — Anne Marie Antonucci
*Assistant Examiner* — Wesam Almadhrhi
(74) *Attorney, Agent, or Firm* — K&L Gates LLP

(57) ABSTRACT

A system is provided that includes a controller having one or more processors. The one or more processors may be configured to obtain first vehicle system data from a first vehicle system of plural vehicle systems based on a common characteristic shared by the plural vehicle systems, and obtain second vehicle system data from a second vehicle system of the plural vehicle systems, the second vehicle system data based on the common characteristic shared by the two or more vehicle systems. The one or more processors may also be configured to compare the first vehicle system data to the second vehicle system data, and identify one of the first vehicle system or the second vehicle system as a candidate vehicle system for maintenance based on comparing the first vehicle system data to the second vehicle system data.

20 Claims, 6 Drawing Sheets

(56) References Cited

U.S. PATENT DOCUMENTS

2019/0193759 A1    6/2019  Ravi et al.
2021/0370926 A1*  12/2021  Lerner ................ B60W 30/095
2022/0236729 A1*   7/2022  Wang .................. B60W 50/029

* cited by examiner

SYSTEM AND METHOD FOR IDENTIFYING CANDIDATE VEHICLE SYSTEMS

BACKGROUND

Technical Field

The subject matter described herein relates to monitoring and comparing vehicle system data from numerous vehicle systems to identify candidate vehicle systems for repair and maintenance.

Description of the Art

Vehicle systems are provided in many different environments and settings. From fleets of automobiles and/or trucks that make deliveries using highways and streets, rail vehicles systems that travel on tracks, fleets of airplanes that travel through the air, to fleets of ships travel through the water. Each vehicle system, whether a single vehicle, or numerous vehicles coupled together, travels along such routes, airways, waterways, etc.

As vehicle systems improve communications, safety, etc., vehicle system data is continuously being obtained. Vehicle system data can include location data, data obtained by sensors that monitor an operating system or component of an operating system, or the like. As the vehicle system data has been obtained, analytics are used to improve operations of vehicle systems. Whether making determinations related to a best route to utilize, or attempting to identify when maintenance is required, algorithms, including artificial intelligence algorithms, have gained popularity as a manner of providing such improvements.

Still, the use of algorithms, and in particular, artificial intelligence algorithms, may have drawbacks. In particular, typically a significant amount of memory space, processing resources, etc. is required for utilizing the algorithms. In addition, often algorithms simply do not consider all of the different variables that a vehicle system may encounter. Weather, humidity, precipitation, terrain, vehicle system age, vehicle system wear, wind conditions, etc. can all have an effect on the performance of operating systems of a vehicle system. As a result, the algorithms when not appropriately accounting for all of these variables can make determinations related to maintenance or repair scheduling when no maintenance or repair is required. In addition, the algorithms can also miss when a vehicle system requires maintenance or repair, resulting in greater damage being caused as a result of operating with a malfunctioning operating system.

BRIEF DESCRIPTION

In accordance with one embodiment, a system is provided that includes a controller having one or more processors. The one or more processors may be configured to obtain first vehicle system data from a first vehicle system of plural vehicle systems based on a common characteristic shared by the plural vehicle systems, and obtain second vehicle system data from a second vehicle system of the plural vehicle systems, the second vehicle system data based on the common characteristic shared by the two or more vehicle systems. The one or more processors may also be configured to compare the first vehicle system data to the second vehicle system data, and identify one of the first vehicle system or the second vehicle system as a candidate vehicle system for maintenance based on comparing the first vehicle system data to the second vehicle system data.

In accordance with one embodiment, a system is provided that may include a controller having one or more processors. The one or more processors may be configured to obtain first vehicle system data from a first vehicle system in a determined area, and obtain additional vehicle system data from plural additional vehicle systems in the determined area. The one or more processors may also be configured to compare the first vehicle system data to the additional vehicle system data, and identify the first vehicle system as a candidate vehicle system for maintenance based on comparing the first vehicle system data to the additional vehicle system data.

In accordance with one embodiment, a method may be provided that includes searching for and identifying vehicle systems based on a common characteristic, and determining whether a threshold number of vehicle systems have been identified during a search. The method may also include varying the common characteristic in response to the threshold number of vehicle systems not being identified, and performing an additional search after varying the common characteristic. The method can also include obtaining first vehicle system data related to a first operational system from a first vehicle system identified in the additional search, obtaining additional vehicle system data related to additional operational systems of plural additional vehicle systems identified in the additional search, wherein the first operational system is related to the additional operational systems, and identifying the first vehicle system as a candidate vehicle system for maintenance based on comparing the first vehicle system data to the additional vehicle system data.

BRIEF DESCRIPTION OF THE DRAWINGS

The inventive subject matter may be understood from reading the following description of non-limiting embodiments, with reference to the attached drawings, wherein below.

DETAILED DESCRIPTION

One or more embodiments of the subject matter described herein relates to a control system for a vehicle system that searches for and identifies common characteristics between different and/or separate vehicle systems. The system then obtains vehicle system data from each vehicle system that had been identified based on the shared common characteristics. The vehicle system data may be related to an operating system of each vehicle system. Then, the vehicle system data related to the operating system of each vehicle is compared to the vehicle system data of the other vehicle systems to identify anomalies in the vehicle system data for one or more individual vehicle systems. If a vehicle system data anomaly exists for a particular vehicle system, that vehicle system is identified as a candidate vehicle system for repair or maintenance. The identification can occur during a trip such that a communication can be provided to a remote controller, such as a maintenance controller, to schedule maintenance and/or repair for the candidate vehicle system.

Figure 1:
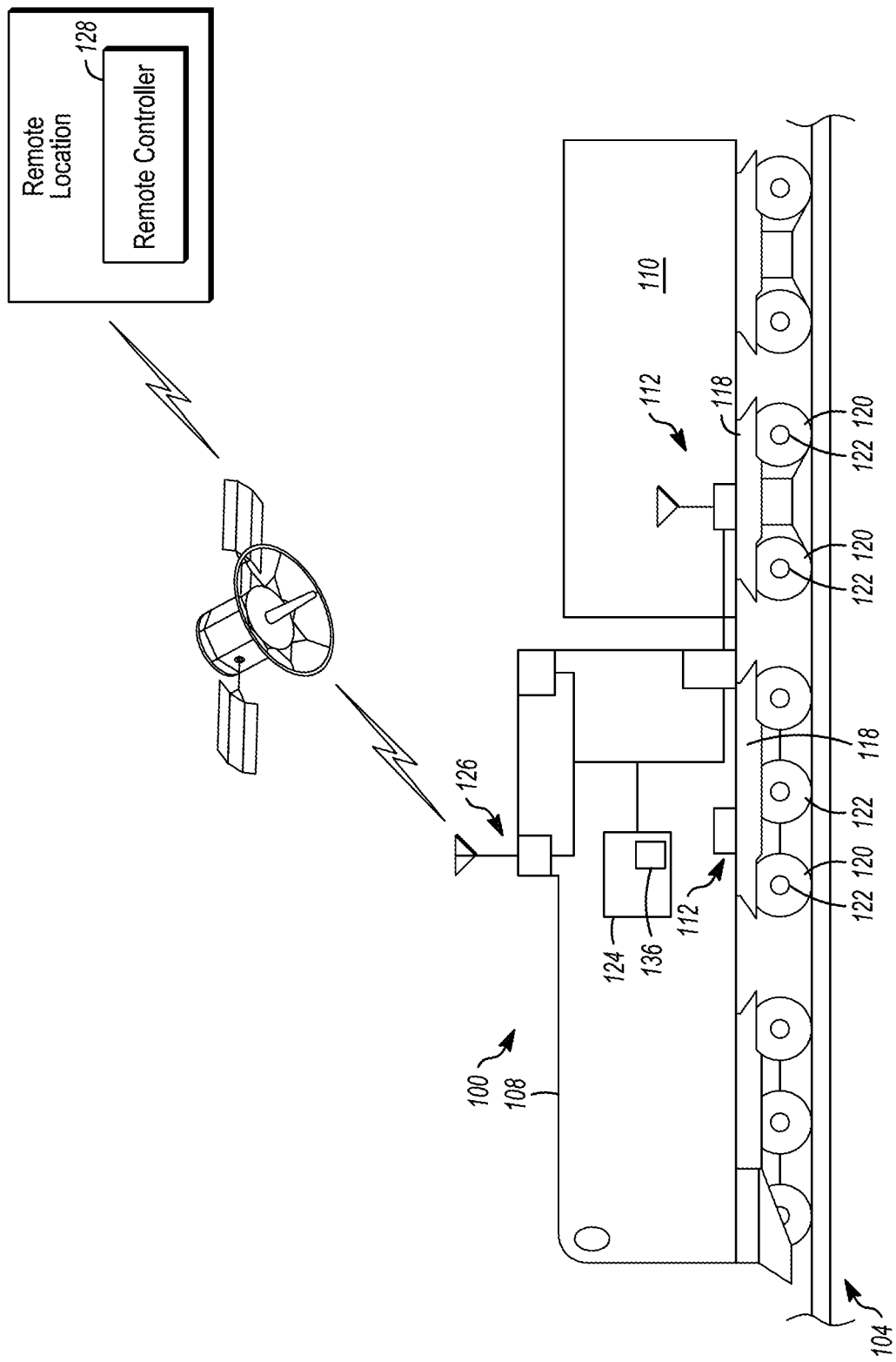
FIG. 1 is a schematic view of a vehicle system.

FIG. 1 illustrates a schematic diagram of one example of a vehicle system 100. While FIG. 1 illustrates the vehicle system as a rail vehicle, in other examples, the vehicle system can include automobiles, marine vessels, airplanes, off road vehicle, construction vehicles, vehicles in a fleet, or the like. In particular, a vehicle system may include a single vehicle or two or more vehicles. The vehicle system may be configured to travel along a route 104 on a trip from a starting or departure location to a destination or arrival location. In the illustrated example, the vehicle system includes a propulsion-generating vehicle 108 and a non-propulsion-generating vehicle 110 that are mechanically interconnected to one another to travel together along the route. The vehicle system may include at least one propulsion-generating vehicle and optionally, one or more non-propulsion-generating vehicles. Alternatively, the vehicle system may be formed of only a single propulsion-generating vehicle.

The propulsion-generating vehicle may generate tractive efforts to propel (for example, pull or push) the vehicle system along routes. The propulsion-generating vehicle includes a propulsion system, such as an engine, one or more traction motors, and/or the like, that operate to generate tractive effort to propel the vehicle system. Although one propulsion-generating vehicle and one non-propulsion-generating vehicle are shown in FIG. 1, the vehicle system may include multiple propulsion-generating vehicles and/or multiple non-propulsion-generating vehicles. In an alternative embodiment, the vehicle system only includes the propulsion-generating vehicle such that the propulsion-generating vehicle is not coupled to the non-propulsion-generating vehicle or another kind of vehicle. In yet another embodiment, the vehicles in the vehicle system are logically or virtually coupled together, but not mechanically coupled together. For example, the vehicles may communicate with each other to coordinate their movements so that the vehicles move together as a convoy (e.g., a vehicle system) without the vehicles being coupled with each other by couplers.

The propulsion-generating vehicle also includes one or more other operating systems 112 that control the operation of the vehicle system. In one example, the operating system is a braking system that generates braking effort to slow or stop movement of the vehicle system. Alternatively, the operating system may be a heating and cooling system, engine and/or transmission system, a bearing system, a wheel system, or other mechanical, electro-mechanical, or electrical system that is used during or for operation of the vehicle system.

In the example of FIG. 1, the vehicles of the vehicle system each include multiple wheels 120 that engage the route and at least one axle 122 that couples left and right wheels together (only the left wheels are shown in FIG. 1). Optionally, the wheels and axles are located on one or more trucks or bogies 118. Optionally, the trucks may be fixed-axle trucks, such that the wheels are rotationally fixed to the axles, so the left wheel rotates the same speed, amount, and at the same times as the right wheel. In one embodiment, the vehicle system may not include axles, such as in some mining vehicles, electric vehicles, etc.

The vehicle system may also include a vehicle controller 124 (e.g. FIG. 2, 214) that may further include a wireless communication system 126 that allows wireless communications between vehicles in the vehicle system and/or with remote locations, such as a remote controller 128 at a remote (e.g., dispatch) location. The communication system may include a receiver and a transmitter, or a transceiver that performs both receiving and transmitting functions. The communication system may also include an antenna and associated circuitry.

The vehicle system may also include a locator device 136. The locator device may be positioned on the vehicle system, utilize wayside devices, etc. In one example, the locator device is a global navigation satellite system (GNSS) receiver, such as a global positioning system (GPS) receiver, that receives signals from remote sources (e.g., satellites) for use in determining locations, movements, headings, speeds, etc., of the vehicle system, and can provide position data related to the vehicle system. Alternatively, the locator device may use WiFi, Bluetooth-enabled beacons, near-field communication (NFC), radio frequency identification (RFID), QR code, etc. to provide location information.

Figure 2:
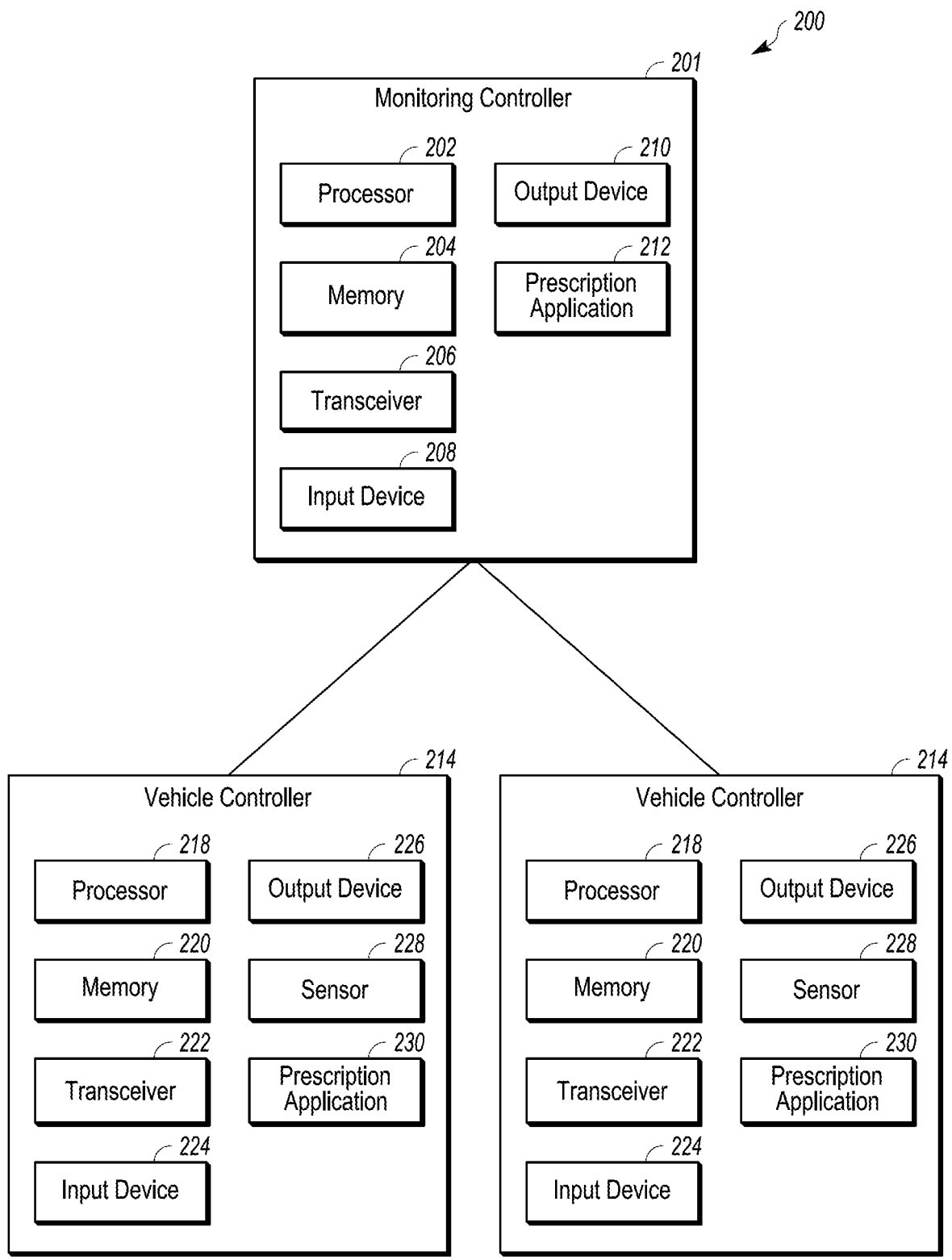
FIG. 2 is a schematic view of a control system of a vehicle system.

FIG. 2 provides a schematic illustration of a control system 200 that may be configured to communicate and monitor numerous vehicle systems. To this end, the vehicles systems can include automobiles, rail vehicles, marine vessels, airplanes, off road vehicles, construction vehicles, vehicles in a fleet, or the like. The control system includes a monitoring controller 201 that includes one or more processors 202 (e.g., microprocessors, integrated circuits, field programmable gate arrays, etc.). The monitoring controller may be located remotely from the vehicle systems, at a dispatch, at a station, at a static location, etc. The one or more processors may receive location data, operating data from operation systems, or the like, from the vehicle controllers. Based on receiving data related to the vehicle system data related to other vehicle systems that travel within a determined or defined area, the one or more processors make determinations related to the health of the monitored vehicle system(s) to identify one or more candidate vehicle systems for maintenance or repair. A determined area may be a geographic area that can be automatically or manually defined. As an example, a circle with a five mile radius from a determined location may be a determined area. An area where certain weather such as rain is occurring may be a determined area. In one example, the determined area can have a boundary or boundaries that are fixed and do not change. Alternatively, the boundary or boundaries of the area may change. For example, an area may include the locations where precipitation is occurring. Optionally, the area can be defined by a postal zip code, city limits, county limits, state boundaries, etc. With this said, a first determined area may be provided, and then a second larger or smaller determined area may also be provided. Still, the area, or location of the perimeter of the determined area may change. In example, the area may be equal, but a perimeter may move resulting in a first determined area (e.g. original perimeter) and a second determined area (e.g. moved perimeter).

The monitoring controller optionally may also include a memory 204, which may be an electronic computer-readable storage device or medium. The monitoring controller memory may be within the housing of the monitoring controller, or alternatively may be on a separate device that may be communicatively coupled to the controller and the one or more processors therein. By "communicatively coupled," it is meant that two devices, systems, subsystems, assemblies, modules, components, and the like, are joined by one or more wired or wireless communication links, such as by one or more conductive (e.g., copper) wires, cables, or buses; wireless networks; fiber optic cables, and the like. The controller memory can include a tangible, non-transitory computer-readable storage medium that stores data on a temporary or permanent basis for use by the one or more processors. The memory may include one or more volatile and/or non-volatile memory devices, such as random access memory (RAM), static random access memory (SRAM), dynamic RAM (DRAM), another type of RAM, read only memory (ROM), flash memory, magnetic storage devices (e.g., hard discs, floppy discs, or magnetic tapes), optical discs, and the like. The memory may be utilized to store information related to location data, movement data, historical data, route data, vehicle data etc. The memory may then be used by the one or more processors to access data for making determinations related to the health of each vehicle system, including the health of each operating system of each vehicle system. In one example, data is logged into a document related to a vehicle system. In another example, data, such as a video feed, may be recorded and stored in the memory for later analysis. In addition, algorithms, applications, models, or the like may also be stored within the memory to be used by the one or more processors in making determinations related to the health of vehicle systems within the area.

The monitoring controller may also include a transceiver 206 configured to communicate with plural vehicle controllers. The transceiver may be a single unit or be a separate receiver and transmitter. In one example, the transceiver may only transmit signals, but alternatively may send (e.g., transmit and/or broadcast) and receive signals.

The monitoring controller may also include an input device 208 and an output device 210. The input device may be an interface between an operator, or monitor, and the one or more processors. The input device may include a display or touch screen, input buttons, ports for receiving memory devices, etc. In this manner, an operator or monitor may manually provide parameters into the controller, including vehicle parameters, route parameters, and trip parameters. Similarly, the output device may present information and data to an operator, or provide prompts for information and data. The output device may similarly be a display or touch screen. In this manner, a display or touch screen may be an input device and an output device.

The monitoring controller can additionally include a prescription application or system 212 for determining the health of vehicle systems that communicate with the monitoring controller. The prescription application may be a program, instructions, or the like, that may be utilized by the one or more processors to search, and make identifications, determinations, etc. related to the health of plural vehicle systems. Optionally, the prescription application can represent hardware circuitry that includes and/or is connected with one or more processors for performing operations described in connection with the prescription system. After the prescription application identifies a candidate vehicle system, a prescription, or suggested tests, repairs, maintenance, etc. may be communicated to a remote controller for maintenance and repair of the vehicle system.

The monitoring controller receives data from vehicle controllers 214 of vehicle systems to compare and analyze the data and make a health diagnosis related to the individual vehicle systems. In one embodiment, only those vehicle controllers on vehicle systems that are within the defined area send their vehicle system data to the monitoring controller. Alternatively, one or more other vehicle controllers on vehicle systems that are not within the area can send their vehicle system data to the monitoring controller. While FIG. 2 illustrates two vehicle controllers, in other examples, five vehicle controllers, ten vehicle controllers, one hundred vehicle controllers, etc. may provide data to the monitoring controller. In one example, the prescription application may reduce the number of common characteristics (e.g. variables) that can cause reduced performance of the vehicle system, to increase the number of vehicle systems identified for comparison and analysis. Alternatively, the prescription application may increase the number of common characteristics that can cause reduced performance of the vehicle system, to decrease the number of vehicle systems identified for comparison and analysis.

In an example, the variables are the weather and environmental conditions in a defined geographic area. In particular, the operation of a vehicle system may be significantly affected by the weather. For example, a wheel sensor may monitor the speed of wheels of a rail vehicle to determine wheel slippage. When a wheel wears or becomes uneven, the wheel may be more apt to slip on a track, such that a wheel sensor measures the wheel spin rate vs. expected spin rate to capture when wheel slip is occurring in an attempt to diagnose a faulty tire. However, environmental conditions including rain, snow, humidity, ice, wind, grade of rail, or the like can also cause wheel slip. As a result, when an algorithm, artificial intelligence (AI) algorithm, etc. is utilized that has a threshold number of wheel slips to diagnose a faulty wheel, error can occur accordingly because there is no way to account for the additional wheel slips occurring as a result of weather instead of wear. As such, the prescription application can utilize the common characteristic of weather to provide an improved determination.

In one example, the common characteristic may be only obtaining data from vehicle systems in a determined area, and then comparing the vehicle system data of such vehicle systems to one another. In one embodiment, the determined area may be a distance from a geographic location. In one example, the determined area may be a one mile radius, in another example, the determined area may be a two mile radius, ten mile radius, or the like. In yet another example, the prescription application may receive a local weather radar, determine that an area a determined weather event, such as rain, is occurring, and have the determined area be within the area rain exists. To this end, the prescription application can also identify similar weather events in different locations. Thus, if a vehicle system in Florida is traveling in rain and 20° C. weather, and a vehicle system in Virginia is also traveling in rain and 20° C. whether, the vehicles systems share a common characteristic even though geographically the vehicle systems are in different locations. In yet another example, the prescription application may have an initial determined area, such as a one mile radius around a determined location, and if a threshold number of vehicle systems are not located in the determined area, the determined area may increase to a subsequent determined area such as a two mile radius around the determined location. Then, the determined area can continue to increase until a threshold number of vehicle systems in the area is reached.

In the example, once the prescription application receives the vehicle system data from the vehicle controllers in the defined area, the vehicle system data (e.g., wheel slip data) of each vehicle system is compared to the other vehicle systems for identifying an anomaly, e.g., indication of an unhealthy wheel. In one example, a designated deviation threshold may be utilized for the analysis and comparison. As a function of the vehicle system data and common characteristic in question, the deviation threshold is a designated delta or difference between two or more data sets (data points or groups of data) that is indicative of one of the data sets being different enough from the other(s) to reflect an increased or greater likelihood of an underlying/related vehicle system requiring maintenance. Thus, if one data set (associated with one vehicle system) is within the designated deviation threshold of other data (of other vehicle systems), this may not be indicative of a greater likelihood of required maintenance, whereas if the one data set is outside the deviation threshold of the other data, this may be indicative of a greater likelihood of required maintenance. For example, the designated deviation threshold may be a standard deviation threshold. The standard deviation is an average distance from a mean of a group. In one example, the standard deviation threshold is the standard deviation itself. In this manner, if one hundred (100) vehicle systems provide wheel slip data for a defined area and the average number of wheel slips while traveling through the defined area is fifteen (15) with a standard deviation of three (3) wheel slips, then the standard deviation threshold is eighteen (18) wheel slips. As a result, any vehicle system having more than 18 wheel slips while in the defined area can be a candidate vehicle system for maintenance. Alternatively, the designated deviation threshold can represent the standard deviation plus a determined amount. So, in the previous example, two (2) additional wheel slips could be added to the calculated standard deviation such that the designated deviation threshold is twenty (20) wheel slips. Consequently, any vehicle system recording more than 20 wheel slips while in the defined area may be a candidate vehicle system for maintenance. Time and/or continuity may also be taken into account, e.g., number of wheel slips while in the defined area during a designated time period, or a designated continuous time period.

While in example embodiments, averages, standard deviations, etc. may be utilized to make a calculation to determine and identify the candidate vehicle system, other calculations similarly can be made, for a designated deviation threshold or otherwise. For example, in the example when 100 vehicle systems in a defined area are analyzed, a mode related to the number of wheel slips may be utilized. In the example, the mode number of wheel slips for the 100 vehicle systems may be 14 wheel slips. Then a determined amount from the mode may be provided, such as five (5) wheel slips to determine a threshold number of wheel slips. As a result, any vehicle system of the 100 vehicle systems in the defined area having more than nineteen (19) wheel slips are determined and identified as candidate vehicle systems for maintenance.

In addition, while in one example, the variable eliminated by utilizing the common characteristic is the environment, in another example, the common characteristic may be an engine type, engine manufacturer, vehicle system age, vehicle system mileage, geographic location on a route, such as a particular tunnel, bridge, straight-away, section of a rout with a similar elevation, grade, etc. In another example, the determined area may not be utilized, and instead, historical data of a specific engine type may be utilized for a comparison. In yet another example, the age of the vehicle system may be utilized as the common characteristic, such that data is only obtained for vehicle systems in a determined age range, such as airplanes that are five to ten years old. In another example, the common characteristic can be the amount of mileage a vehicle system has. For example, the prescription application may only obtain vehicle system data related to automobiles with between 100,000 miles and 150,000 miles and compare performance.

In addition, multiple common characteristics may be utilized. For example, vehicle system data may be obtained from a determined area for a specific engine type. In one embodiment, the vehicle system data related to the determined area may have a first weight associated therewith, while the vehicle system data related to the specific engine type may have a second weight associated therewith. In examples, the weight may be the same, different, or may vary based on utilization of an algorithm, including an artificial intelligence algorithm, or the like. For example, the prescription application may obtain automobile vehicle system data for every vehicle system of a certain manufacturer in a five mile radius that is less than five years old. Thus, by taking similar vehicle systems and comparing vehicle system data of such similar vehicle systems, differences or deviations (e.g., anomalies) that may indicate an unhealthy condition of an operating system of a vehicle system can be determined for identifying candidate vehicle systems for repair and maintenance.

In one example, the comparison of the vehicle system data may be a comparison of first vehicle system data to second vehicle system data. The comparison can also include a comparison of the first vehicle system data and additional vehicle system data. To this end, the second vehicle system data may be compared to the additional vehicle system data.

Each vehicle controller can include one or more processors 218 (microprocessors, integrated circuits, field programmable gate arrays, etc.), a memory 220, which may be an electronic, computer-readable storage device or medium, a transceiver 222 configured to communicate with the monitoring controller, an input device 224 and an output device 226. The input device may be an interface between an operator, or monitor, and the one or more processors. The input device may include a display or touch screen, input buttons, ports for receiving memory devices, etc. In this manner, an operator or monitor may manually provide parameters into the vehicle controller, including vehicle parameters, route parameters, and trip parameters.

The controller may also include one or more sensors 228 disposed within and adjacent the area to detect movement data, area data, vehicle data, route data, etc. The one or more sensors may be pressure sensors, temperature sensors, speed sensors, voltmeters, angular speed sensors, etc. and may measure fluid levels, wheel speed, axle temperature, fluid temperature, engine performance, braking performance and wear, etc. The one or more sensors monitor different operating systems of the vehicle system to obtain vehicle system data that may be utilized by the prescription application, or may be utilized by the one or more processors of the vehicle controller to analyze and make determinations that are communicated to the prescription application. The vehicle system data from each vehicle system can then be utilized to compare to one another to determine faults and unhealthy operating systems. Optionally, the vehicle controller may also include a prescription application 230 that more efficiently processes data and information for communication with the prescription application of the monitoring device.

In one example, the one or more sensors may include a locator device. In one example, the locator device is a GNSS receiver, such as a global positioning system (GPS) receiver that receives signals from remote sources (e.g., satellites) for use in determining locations, movements, headings, speeds, etc., of the vehicles, and can provide position data related to the vehicle system. Alternatively, the locator device may use WiFi, Bluetooth-enabled beacons, near-field communication (NFC), radio frequency identification (RFID), QR code, etc. to provide location information.

Figure 3:
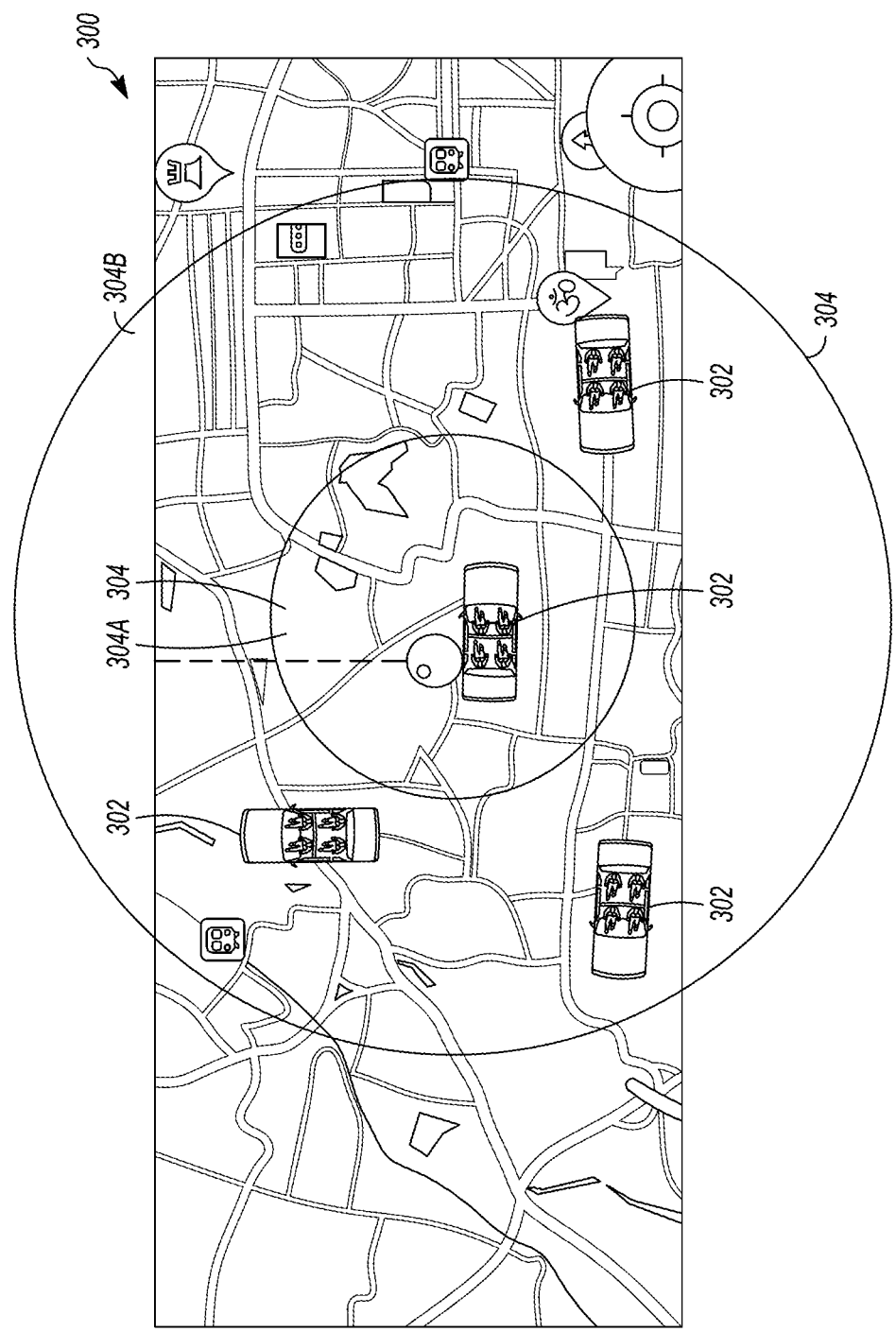
FIG. 3 is a schematic view of an environment of a vehicle system.

FIG. 3 illustrates an example environment 300 in which one or more vehicle systems 302 are monitored to identify one or more candidate vehicle systems for repair or maintenance as a result of a malfunctioning operating system. The environment may include roadways, railways, waterways, runways, airways, or the like. To this end, while FIG. 3 illustrates the vehicle systems as automobiles, the vehicle systems may also be rail vehicles, marine vessels, airplanes, off road vehicles, construction vehicles, vehicles in a fleet, or the like. In particular, a vehicle system may include a single vehicle as provided in FIG. 3, or alternatively include numerous vehicles coupled together. In one example, the vehicle system is a rail vehicle as illustrated in FIG. 1.

Each vehicle system may include a vehicle controller (FIG. 2) with a vehicle locator device. Each vehicle controller can communicate with a monitoring controller that includes a prescription application. The monitoring controller may be located remotely from the vehicle systems, and may be a dispatch controller, station controller, air tower controller, or the like.

In one example, the prescription application may continuously receive location data and operational data from each of the vehicle systems within a determined area 304. In the example of FIG. 3, a first determined area 304A and second determined area 304B are provided. In particular, the prescription application in one example receives the vehicle system data from only the vehicle systems within the first determined area; however, the prescription application may determine that a threshold number of vehicle systems is not located within the first determined area, resulting in the larger second determined area to be utilized for receiving the operational data. After receiving the vehicle system data, the prescription application may compare the vehicle system data of vehicle systems to determine anomalies. For example, the vehicle system data received may be the temperature of lubricating oil in a gear box of an axle. Then each temperature can be compared, an average taken, a mode determined, a standard deviation determined, or the like, to see if an anomaly exists for one of the four vehicles. Alternatively, engine temperature, wheel slippage, wheel angular speed, wheel temperature, brake pressure, etc. can all be obtained for comparison to determine operating systems that may be malfunctioning. In this manner, candidate vehicle systems for repair, maintenance, etc. can be identified while the vehicle systems are in operation. Because only a determined area is utilized as a common characteristic, variance as a result of environmental of outside temperature differences are eliminated, enhancing accuracy of a diagnosis.

While in this example determined areas are utilized as the common characteristic to determine which vehicle systems will be compared to one another, in other examples, other common characteristics may be utilized. For example, the prescription application may use all vehicle systems that have a same or similar engine type or model, as vehicle systems that are a similar age or millage, a vehicle systems that take a similar or a same route, combinations thereof, etc. In one example, vehicle system data may be obtained from a similar geographic location on a route, such as a particular tunnel, bridge, straight-away, section of a rout with a similar elevation, grade, etc. In this manner, vehicle system data of similarly situated vehicle systems are compared, resulting in variances being a result of a malfunctioning component of an operating system rather than environment, age, wear, etc. related results.

Figure 4:
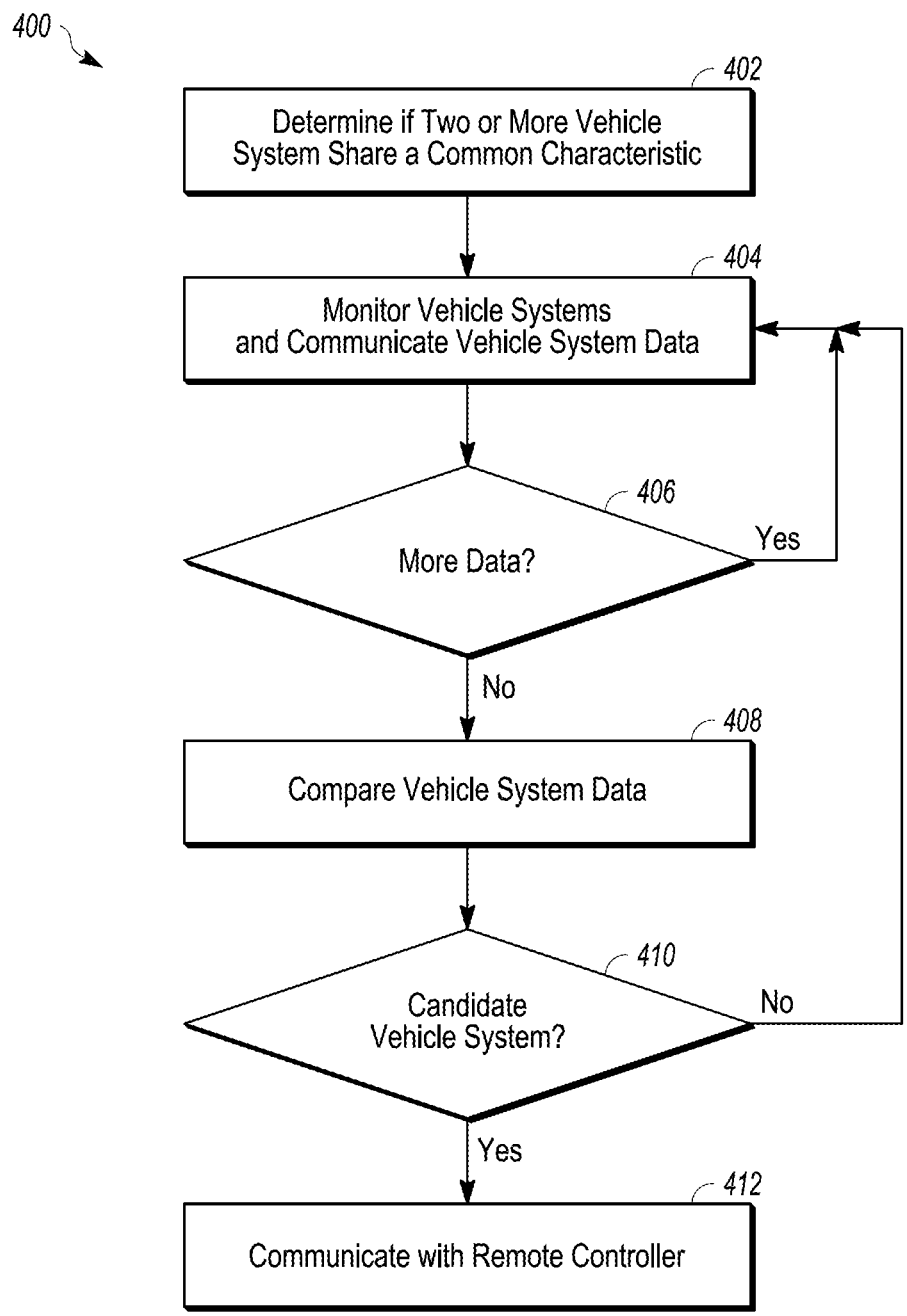
FIG. 4 is a block flow diagram of a method of identifying a malfunctioning operating system of a vehicle system.

FIG. 4 illustrates a method for identifying a candidate vehicle system for repair and/or maintenance. The candidate vehicle system may need repair and/or maintenance as a result of an operating system or component of an operating system that is not operating, an operating system or component that is operating, but is not operating as well, efficiently, desired, etc. as other, similarly-situated operating systems or components. In one example, a wheel may be detected as slipping once every 5 miles, whereas other wheels of the vehicle system only slip once every 20 miles. In another example, an engine temperature of one vehicle system may be operating ten degrees Celsius greater than the engine another vehicle system. In this manner, the vehicle systems may still be operating; however, higher frequency of wheel slips, temperature difference, etc. may be indicative that an operating system is not operating as well, efficiently, desired etc. as the other operating systems. By making the identification of the candidate vehicle system while the vehicle systems are in route, maintenance can be scheduled to address the operating system before a more serious condition such as wheel failure, engine failure, or the like occurs.

In one example the vehicle system of FIG. 1 is a vehicle system that is monitored for the method. In another example, the control system of FIG. 2 is utilized to implement the method of FIG. 4. Similarly, in one example, the environment and vehicle systems of FIG. 3 may be the environment and vehicle systems implementing the method of FIG. 4.

At 402, a determination is made whether two or more vehicle systems share a common characteristic. A common characteristic may be any parameter, attribute, or the like that the two or more vehicle systems share. In one example, the common characteristic is a defined area. In this manner, if the determined area is a one hundred mile radius of a determined location, then each vehicle system within the defined area shares the common characteristic of being within the defined area. In another example, the common characteristic may be the vehicle system mileage. In the example, all vehicle systems having over one hundred thousand miles can share the common characteristic of having over one hundred thousand miles. In one example, the common characteristic may relate to a make and/or model of a vehicle, the make or model of a component of an operating system, such as an engine, the manufacturer of a vehicle, a manufacturer or type of tire, an outdoor temperature at which a vehicle system is operating, an outdoor weather condition at which a vehicle operates including the presence of rain, sleet, snow, ice, wind, humidity, or the like, a type of material utilized by a component of an operating system such as a tire, or the like. In one example, the determination of the common characteristic may be provided by a user of a vehicle system, user of a monitoring system monitoring plural vehicle systems, set by a prescription application, determined by a prescription application, etc.

At 404, vehicle systems are monitored, and vehicle system data related to operating systems, and operating system components are communicated to a monitoring controller based on the common characteristic. For example, when the common characteristic is a defined area, then every vehicle system in the defined area communicates vehicle system data to the monitoring controller. Alternatively, if the vehicle systems are airplanes, and the common characteristic is flying over the ocean on a route, then every vehicle system monitored that flies over the ocean during its route communicates the vehicle system data to the monitoring controller. In each instance, because each vehicle system shares the common characteristic, when the vehicle system data of one of the vehicle systems is compared to the vehicle system data of another vehicle system, there is an increased likelihood differences in vehicle system data are related to an operating system, component of an operating system, sensor, etc. malfunctioning or not operating properly.

At 406, optionally, a determination is made whether additional vehicle system data is desired. In particular, the prescription application may include a threshold number of vehicle systems that must share the common characteristic before a comparison can be made to identify a candidate vehicle system that requires repair, and/or maintenance. In one example, a first defined area may be a ten mile radius, but only three vehicle systems are detected in the ten mile radius. Because a threshold number of five vehicle systems are required for a comparison, the first defined area may be increased into a second defined area, such as a twenty mile radius where seven vehicle systems are detected. Alternatively, instead of increasing the first defined area to a second defined area, historical data may be utilized to increase the number of vehicle systems for a comparison. In particular, the reason for utilizing a defined area is to ensure that environmental and whether conditions do not result in variances in operational data. Consequently, in one example, historical data from the defined area can be analyzed to determine similar weather when the historical data was communicated. In an embodiment, a whether condition is rain, so when only four vehicle systems are detected in the defined area, historical data from vehicle systems obtained when rain was occurring is utilized. As such, the database that is formed by the monitoring controller can be utilized for additional vehicle system vehicle system data to make determinations related to the operating systems and components of operating systems.

In another example a threshold could be utilized to increase the number of common characteristics between vehicle systems. For example, if the defined area is a fifty mile radius and one hundred vehicles are detected, the prescription application may include a threshold number of forty vehicles. As a result, when the one hundred vehicles are detected in the defined area, the prescription application may vary the common characteristic to be any vehicle system within the fifty mile radius having a hybrid engine. As a result, the number of vehicles systems having the common characteristic drops to eight, causing the threshold to not be exceeded. In this manner, the common characteristic can be varied. Consequently, when the vehicle system data between the vehicle systems is compared, faulty operation is the most likely cause for variance in the vehicle system data.

If at 406, additional vehicle system data is desired, then the vehicle system data continues to be communicated at 404. Thus, whether more vehicle system data, less vehicle system data, etc. is desired, the common characteristic can be varied to provide an improved data set for a comparison.

If at 406, additional vehicle system data is not desired, then at 408, a comparison is made between at least the vehicle system data of a first vehicle system and the vehicle system data of a second vehicle system to identify a malfunctioning operating system or component of an operating system. In one example, a comparison includes determining whether data associated with one vehicle system is within a designated deviation threshold of corresponding data associated with plural other vehicle systems; if within the threshold it is less likely the vehicle system is a candidate for maintenance, and if outside the threshold it is more likely the vehicle system is a candidate for maintenance. In another example, a comparison is provided by taking an average of a measurement from each vehicle system monitored and determining if the measurement is greater than a threshold percentage from the average. In another example, the comparison occurs by providing a determined error factor from the average. So, if an average temperature is measured at 100° C., the determined error factor can be 5° C. such that any measurement at plus or minus 5° C. is identified as a candidate vehicle system for maintenance. In alternative embodiments, the comparison may be provided using modes, averages, standard deviations, or the like to identify the candidate vehicle systems. As a result, candidate vehicle systems for maintenance are identified based on identifying anomalies in vehicle system data. By utilizing vehicle systems in the same defined area, having the same or similar environment, having the same or similar age, having the same or similar mileage, having the same manufacturer, engine model or type, etc. more accurate comparisons can be made between vehicle in identifying the candidate vehicle systems. To this end, errors that can our when vehicle system data is analyzed by an algorithm, artificial intelligence algorithm, or the like because certain variables are not taken into consideration are reduced.

At 410, a determination is made whether a vehicle system has a malfunctioning operating system, or component of an operating system based on the comparison of the first vehicle system data and the second vehicle system data. If it is deemed there is a low likelihood of malfunctioning having occurred, then the monitoring system continues to monitor the vehicle systems having the common characteristic(s). If at 410, a determination is made that a malfunctioning operating system or component of an operating system may be presented, then at 412, the vehicle controller communications the first vehicle system data to a remote controller in response to identifying the first vehicle system as the candidate vehicle system. The communication may include the operating system or component of the operating system that is malfunctioning, a request to schedule maintenance or repair for the component or operating system, the vehicle system data resulting in the determination, or the like. In this manner, maintenance is scheduled as soon as possible, resulting in malfunctioning system from not resulting in greater damage to the vehicle system. In addition, preparation can begin being made for repair and maintenance before the vehicle system even reaches a maintenance location, improving efficiency of the maintenance at the maintenance location.

Figure 5A:
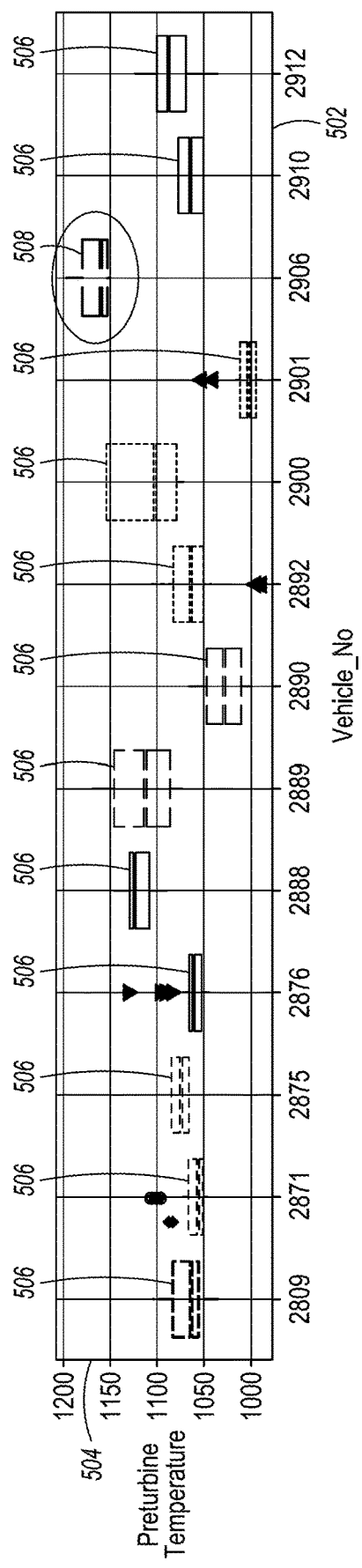
FIG. 5A is a graph of vehicle system data.
Figure 5B:
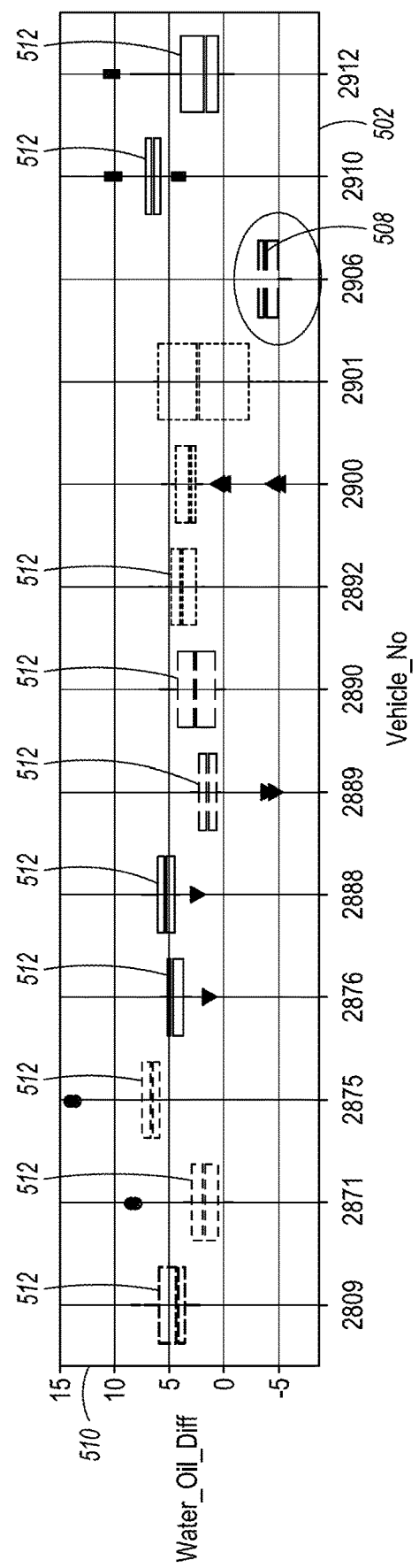
FIG. 5B is a graph of vehicle system data.

FIGS. 5A and 5B illustrate graphs of vehicles system data in accordance with the systems and methods described herein. Graph 5A illustrates on the X-axis vehicle systems 502 that share a common characteristic. The common characteristic may be any of the previously described common characteristics, including a determined distance from a geographic location (e.g. a determined area). The Y-axis meanwhile illustrates parameter of an operating system, that in this example is a turbine temperature 504 for each of the vehicle systems. In one example, a temperature sensor is associated with the turbine of each vehicle system that communicates the turbine temperature. Each vehicle system has a corresponding turbine temperature 506, where an error factor, or variance, is also provided. From the graph, an anomaly 508 is provided for the vehicle system identified as 2906.

FIG. 5B meanwhile provides the exact same vehicle systems 502 on the X-axis, while having a Y-axis providing a water to oil differential 510. Again, a corresponding water to oil differential 512 for each vehicle that includes a variance or error. In this example, again, an anomaly 514 is provided in the vehicle system data for the vehicle system identified as 2906. Based on this comparison information, a determination may be made that the vehicle system identified as 2906 is a candidate vehicle system that requires maintenance or repair. Thus, a communication may be provided to a dispatch controller, maintenance controller, station controller, other remote controller, etc. providing the vehicle system data and scheduling maintenance for vehicle system identified as 2906 while the vehicle system is still on the route.

Figure 6A:
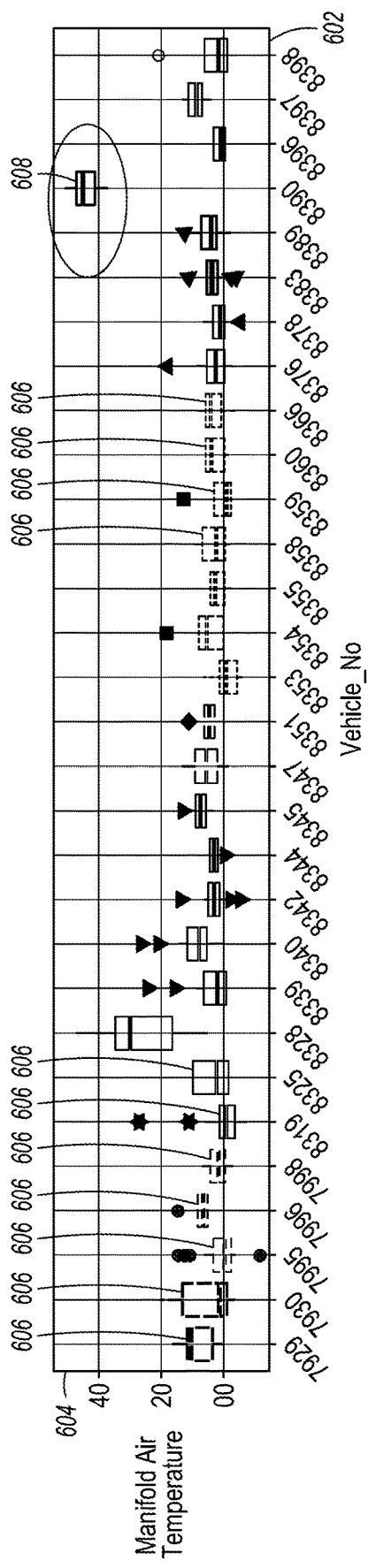
FIG. 6A is a graph of vehicle system data.
Figure 6B:
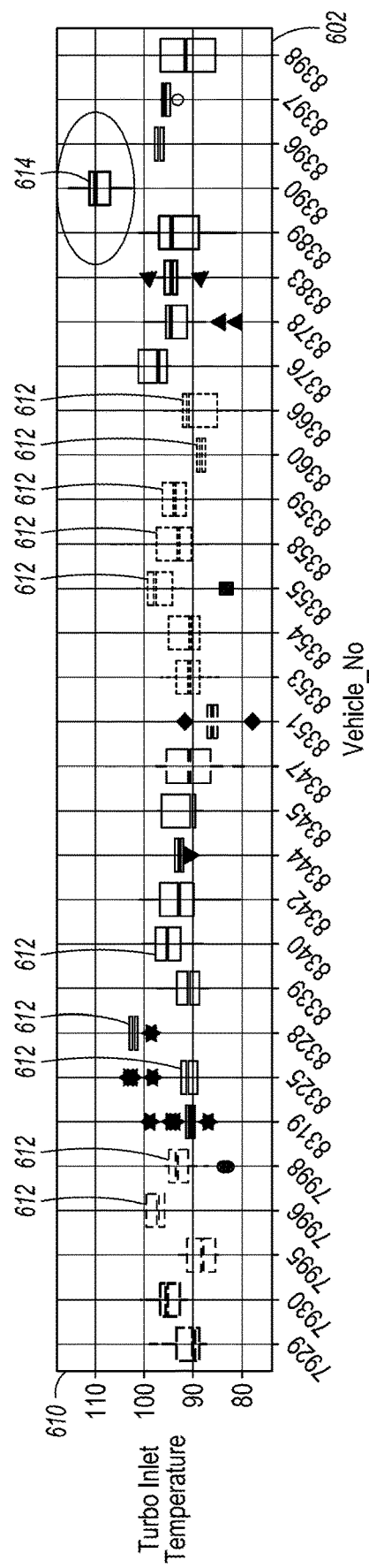
FIG. 6B is a graph of vehicle system data.

FIGS. 6A and 6B, illustrate yet another example of vehicle system data obtained and compared consistent with the methods and systems described herein. In this example, the X-axis again presents individual vehicle systems 602, while the Y-axis of FIG. 6A provides a parameter, and in particular a manifold air temperature 604 such that manifold air temperatures 606 of each vehicle system are compared. Again, errors in readings, and variances may be provided in an effort to identify an anomaly 608 that in this example is the vehicle system identified as vehicle system 8390. Meanwhile, FIG. 6B illustrates the same group of vehicle systems, with an additional parameter, this time turbo inlet temperature 610 considered. Each plot therefore provides an individual turbo inlet temperature 612 of each vehicle system, with an anomaly 614 again illustrated for the vehicle system identified as vehicle system 8390. Therefore, a communication can be made related to maintenance of vehicle system 8390 as a candidate vehicle system. While in each example, an anomaly was illustrated in both graphs for the same vehicle system, in other example, only one graph will provide an anomaly. The communication can then share this information to assist with diagnosis of the component or operating system that is causing the malfunction.

Consequently, a method and system for identifying candidate vehicle systems for maintenance and repair is provided that avoid the use of complex algorithms, including artificial intelligence algorithms, that occupy memory and processing space for a control system. In addition, by utilizing vehicle systems with common characteristics, improved diagnosis may also be provided, while improving efficiencies once a candidate vehicle system is identified.

In particular, the system identifies anomalies in a data stream, without prior training (e.g. using artificial intelligence), by measuring the difficulty in finding similarities between vehicle systems that share at least one common characteristic in an ordered sequence of the streaming data. Data elements, or vehicle system data, that is alike in one example obtains a low score, or a determination is made that the vehicle systems are not candidate vehicle systems for repair or maintenance. On the other hand, when vehicle systems having the common characteristic also have dissimilar vehicle system data, a high score may be provided due to data mismatches. This score can be used to identify a candidate vehicle system (for repair or maintenance). In this manner, the control system makes use of a comparison method to find dissimilarities between parts of the data stream and does not require prior determinations or knowledge (i.e. artificial intelligence) of the nature of the anomalies that may be present in the vehicle system data. In addition, the comparison method avoids the use of processing dependencies between data elements and, is capable of a straightforward parallel implementation for each data element. The control system instead searches for anomalous patterns in data streams (e.g. vehicle system data), which may include audio signals, health screening, geographical data, etc.

In particular, identification or determination of healthy or unhealthy vehicle systems can be based on a relativity in a similar condition. In instances where vast amounts of sensor data is provided for various fleets, vehicle systems, or the like, comparisons of the vehicle system data for similar operating systems of the vehicle system can identify candidate vehicle systems for repair or maintenance. Typically, sensor information is raw data, which generally may not be helpful to determine the anomaly because without context, the data can be meaningless. For example, when an engine temperature of a first vehicle system is 5° C. greater than the engine temperature of a second vehicle system, the 5° C. may or may not be significant. If the vehicle systems are in the same environment, such a difference may be significant, whereas is the vehicle system with the 5° C. hotter engine temperature is in an environment that is 20° C. hotter, the difference may not be as meaningful. As a result, with the huge data sets obtained, sometimes it is difficult to develop a robust model based on machine learning due to unit to unit variation (e.g. mechanical, design, environmental etc.). However, provided is a control system and method that finds a vehicle system anomaly built on a comparison of various parameters of vehicle systems sharing a common characteristic. For example, four vehicle systems may share the common characteristic of being in the same environment (e.g. same twenty-five mile radius, fifty mile radius, hundred mile radius, etc.), and consequently are moving in the same geographical location. If one of the operating systems of one of the vehicle systems behaves differently compared to the other vehicle systems in the same environment, the vehicle system with the operating system that is behaving differently may be identified as a candidate vehicle system for repair or maintenance. At that time, communications can be provided to start the maintenance and repair of the candidate vehicle system to address the anomaly as quickly as possible, preventing damage as a result of a malfunctioning operating system.

In some example embodiments, a system is provided that includes a controller having one or more processors. The one or more processors may be configured to obtain first vehicle system data from a first vehicle system of plural vehicle systems based on a common characteristic shared by the plural vehicle systems, and obtain second vehicle system data from a second vehicle system of the plural vehicle systems, the second vehicle system data based on the common characteristic shared by the two or more vehicle systems. The one or more processors may also be configured to compare the first vehicle system data to the second vehicle system data, and identify one of the first vehicle system or the second vehicle system as a candidate vehicle system for maintenance based on comparing the first vehicle system data to the second vehicle system data.

Optionally, the common characteristic may be based on a distance from a geographic location. In one aspect, the one or more processors may also be configured to compare the first vehicle system data to the second vehicle system data by comparing the first vehicle system data and the second vehicle system data to additional vehicle system data of one or more additional vehicle systems of the plural vehicle systems. The additional vehicle system data may be based on the common characteristic. In another aspect, the first vehicle system data may be related to an operating system of the first vehicle system, and the second vehicle system data is related to an operating system of the second vehicle system. In addition, the operating system of the first vehicle system may be related to the operating system of the second vehicle system. In one example, the one or more processors may be further configured to communicate a message to a remote controller related to the candidate vehicle system. Optionally, the remote controller may be a maintenance controller configured to schedule maintenance for the first vehicle system or a dispatch controller configured to schedule maintenance for the first vehicle system. In another example, the common characteristic may be at least one of engine type, engine manufacturer, vehicle system age, vehicle system mileage, or vehicle system route. In one embodiment, the one or more processors may be further configured to search for and identify one or more additional vehicle systems of the plural vehicle systems based on the common characteristic before obtaining the first vehicle system data and the second vehicle system data. Optionally, the one or more processors may further be configured to determine whether a threshold number of the one or more additional vehicle systems have been identified in response to searching for the additional vehicle systems, vary the common characteristic in response to the threshold number of vehicle systems not being identified, and perform an additional search for the one or more additional vehicle systems after varying the common characteristic.

In other example embodiments, a system is provided that may include a controller having one or more processors. The one or more processors may be configured to obtain first vehicle system data from a first vehicle system in a determined area, and obtain additional vehicle system data from plural additional vehicle systems in the determined area. The one or more processors may also be configured to compare the first vehicle system data to the additional vehicle system data, and identify the first vehicle system as a candidate vehicle system for maintenance based on comparing the first vehicle system data to the additional vehicle system data.

Optionally, the determined area may be a determined radius from a determined location. In one aspect, the plural additional vehicle systems may include at least two vehicle systems. In another aspect, the first vehicle system data may be related to an operating system of the first vehicle system. In one example, the system may also include a sensor coupled to the operating system. In particular, the first vehicle system data may be obtained from the sensor. In another example, the one or more processors may be further configured to communicate the first vehicle system data to a remote controller in response to identifying the first vehicle system as the candidate vehicle system. In another example, the first vehicle system may be one of an automobile, rail vehicle, water vehicle, or air vehicle.

In one or more additional embodiments, a method may be provided that includes searching for and identifying vehicle systems based on a common characteristic, and determining whether a threshold number of vehicle systems have been identified during a search. The method may also include varying the common characteristic in response to the threshold number of vehicle systems not being identified, and performing an additional search after varying the common characteristic. The method can also include obtaining first vehicle system data related to a first operational system from a first vehicle system identified in the additional search, obtaining additional vehicle system data related to additional operational systems of plural additional vehicle systems identified in the additional search, wherein the first operational system is related to the additional operational systems, and identifying the first vehicle system as a candidate vehicle system for maintenance based on comparing the first vehicle system data to the additional vehicle system data.

Optionally, the common characteristic may be a defined area. In one aspect, varying the common characteristic in response to the threshold number of plural additional vehicle systems not being identified may include increasing a size of the defined area. In another aspect, the method may also include communicating the first vehicle system data to a remote controller in response to identifying the first vehicle system as the candidate vehicle system.

In one or more additional embodiments a system is provided that may include a controller having one or more processors. The one or more processors may obtain plural first corresponding data sets from plural vehicle systems based on plural first common characteristics shared by the plural vehicle systems, and obtain plural second corresponding data sets from the plural vehicle systems based on the plural first common characteristics and/or on plural second common characteristics shared by the plural vehicle systems. The one or more processors may also iteratively compare an individual data set of the plural first corresponding data sets of each of the plural vehicle systems to determine if the individual data set of the plural first corresponding data sets is outside a first designated deviation threshold of the other data sets of the plural first corresponding data sets. The one or more processors may also iteratively compare an individual data set of the plural second corresponding data sets of each of the plural vehicle systems to determine if the individual data set of the plural second corresponding data sets is outside a second designated deviation threshold of the other data sets of the plural second corresponding data sets. The one or more processors may also, responsive to determining that the individual data sets of a first vehicle system of the plural vehicle systems are respectively outside the first designated deviation threshold and the second designated deviation threshold, identify the first vehicle system as a candidate for a maintenance or repair operation. The one or more processors may also control at least one of the first vehicle system or an electronic device responsive to identifying the first vehicle system as the candidate.

In some example embodiments, the device performs one or more processes described herein. In some example embodiments, the device performs these processes based on processor executing software instructions stored by a computer-readablemedium, such as a memory and/or a storage component. A computer-readable medium (e.g., anon-transitory computer-readable medium) is defined herein as a non-transitory memory device. A memory device includes memory space located inside of a single physical storage device or memory space spread across multiple physical storage devices.

Software instructions may be read into a memory and/or a storage component from another computer-readable medium or from another device via the communication interface. When executed, software instructions stored in a memory and/or a storage component cause the processor to perform one or more processes described herein. Additionally or alternatively, hardwired circuitry may be used in place of or in combination with software instructions to perform one or more processes described herein. Thus, embodiments described herein are not limited to any specific combination of hardware circuitry and software.

As used herein, the terms "processor" and "computer," and related terms, e.g., "processing device," "computing device," and "controller" may be not limited to just those integrated circuits referred to in the art as a computer, but refer to a microcontroller, a microcomputer, a programmable logic controller (PLC), field programmable gate array, and application specific integrated circuit, and other programmable circuits. Suitable memory may include, for example, a computer-readable medium. A computer-readable medium may be, for example, a random-access memory (RAM), a computer-readable non-volatile medium, such as a flash memory. The term "non-transitory computer-readable media" represents a tangible computer-based device implemented for short-term and long-term storage of information, such as, computer-readable instructions, data structures, program modules and sub-modules, or other data in any device. Therefore, the methods described herein may be encoded as executable instructions embodied in a tangible, non-transitory, computer-readable medium, including, without limitation, a storage device and/or a memory device. Such instructions, when executed by a processor, cause the processor to perform at least a portion of the methods described herein. As such, the term includes tangible, computer-readable media, including, without limitation, non-transitory computer storage devices, including without limitation, volatile and non-volatile media, and removable and non-removable media such as firmware, physical and virtual storage, CD-ROMS, DVDs, and other digital sources, such as a network or the Internet.

The singular forms "a", "an", and "the" include plural references unless the context clearly dictates otherwise. "Optional" or "optionally" means that the subsequently described event or circumstance may or may not occur, and that the description may include instances where the event occurs and instances where it does not. Approximating language, as used herein throughout the specification and claims, may be applied to modify any quantitative representation that could permissibly vary without resulting in a change in the basic function to which it may be related. Accordingly, a value modified by a term or terms, such as "about," "substantially," and "approximately," may be not to be limited to the precise value specified. In at least some instances, the approximating language may correspond to the precision of an instrument for measuring the value. Here and throughout the specification and claims, range limitations may be combined and/or interchanged, such ranges may be identified and include all the sub-ranges contained therein unless context or language indicates otherwise.

This written description uses examples to disclose the embodiments, including the best mode, and to enable a person of ordinary skill in the art to practice the embodiments, including making and using any devices or systems and performing any incorporated methods. The claims define the patentable scope of the disclosure, and include other examples that occur to those of ordinary skill in the art. Such other examples are intended to be within the scope of the claims if they have structural elements that do not differ from the literal language of the claims, or if they include equivalent structural elements with insubstantial differences from the literal language of the claims.

What is claimed is:

1. A system comprising:
a controller having one or more processors configured to:
   search for vehicle systems based on a common characteristic shared by the vehicle systems;
   determine whether a threshold number of the vehicle systems have been identified during the search;
   vary the common characteristic in response to the threshold number of the vehicle systems not being identified;
   perform an additional search after varying the common characteristic;
   obtain first vehicle system data from an operating system of a first vehicle system identified in the additional search, the first vehicle system data based at least in part on the common characteristic;
   obtain additional vehicle system data from one or more operating systems of one or more respective additional vehicle systems identified in the additional search, the additional vehicle system data based at least in part on the common characteristic;
   identify the first vehicle system as a candidate vehicle system for maintenance based on the first vehicle system data and the second additional vehicle system data; and
   control one or more operating systems of the first vehicle system responsive to identifying the first vehicle system as the candidate vehicle system.

2. The system of claim 1, wherein the common characteristic is based on a distance from a geographic location.

3. The system of claim 1, wherein the operating system of the first vehicle system is related to the one or more operating systems of the one or more respective additional vehicle systems.

4. The system of claim 1, wherein the common characteristic is at least one of engine type, engine manufacturer, vehicle system age, vehicle system mileage, or vehicle system route.

5. The system of claim 1, wherein the common characteristic is selected based at least in part on user input received by an input device communicatively coupled with the controller.

6. The system of claim 1, wherein the one or more processors are further configured to automatically communicate a request to schedule the maintenance for the candidate vehicle system to a remote controller in response to identifying the candidate vehicle system.

7. The system of claim 6, wherein the one or more processors are further configured to:
   communicate a message to the remote controller, the message comprising at least one of the first vehicle system data or maintenance instructions.

8. The system of claim 7, wherein the remote controller is a maintenance controller configured to schedule the maintenance for the first vehicle system or a dispatch controller configured to schedule the maintenance for the first vehicle system.

9. The system of claim 6, wherein the request to schedule the maintenance is operable to be communicated while the candidate vehicle system is traveling on a route.

10. The system of claim 1, wherein the first vehicle system data comprises real-time first vehicle system data and the additional vehicle system data comprises real-time additional vehicle system data.

11. A system comprising:
a controller having one or more processors configured to:
   search for vehicle systems in a determined area;
   determine whether a threshold number of the vehicle systems have been identified during the search;
   vary the determined area in response to the threshold number of the vehicle systems not being identified;
   perform an additional search after varying the determined area;
   obtain first vehicle system data from a first operating system of a first vehicle system in the determined area;
   obtain additional vehicle system data from one or more additional operating systems of one or more respective additional vehicle systems in the determined area;
   identify the first vehicle system as a candidate vehicle system for maintenance based on the first vehicle system data and the additional vehicle system data; and control one or more operating systems of the first vehicle system responsive to identifying the first vehicle system as the candidate vehicle system.

12. The system of claim 11, wherein the determined area is a determined radius from a determined location.

13. The system of claim 11, wherein the plural additional vehicle systems include at least two vehicle systems.

14. The system of claim 11, wherein the one or more processors are further configured to:
    obtain the additional vehicle system data from the one or more additional vehicle systems based on a determination that the one or more additional vehicle systems and the first vehicle system share plural common characteristics;
    compare the first vehicle system data to the additional vehicle system data to determine if the first vehicle system data is outside a designated deviation threshold of the additional vehicle system data; and
    identify the first vehicle system as the candidate vehicle system for maintenance responsive to determining that the first vehicle system data is outside the designated deviation threshold.

15. The system of claim 11, wherein the determined area includes a boundary configured to change in relation to an area of one or more environmental conditions.

16. A method comprising:
    performing, with one or more processors, a search to identify vehicle systems based on a common characteristic;
    determining, with the one or more processors, whether a threshold number of the vehicle systems have been identified during the search;
    varying, with the one or more processors, the common characteristic in response to the threshold number of the vehicle systems not being identified;
    performing, with the one or more processors, an additional search after varying the common characteristic;
    obtaining first vehicle system data from a first operational system of a first vehicle system identified in the additional search;
    obtaining additional vehicle system data from one or more additional operational systems of one or more respective additional vehicle systems identified in the additional search, wherein the first operational system is related to the one or more additional operational systems;
    identifying the first vehicle system as a candidate vehicle system for maintenance based on the first vehicle system data and the additional vehicle system data; and
    controlling one or more operating systems of the first vehicle system responsive to identifying the first vehicle system as the candidate vehicle system.

17. The method of claim 16, wherein the common characteristic is a defined area.

18. The method of claim 17, wherein varying the common characteristic in response to the threshold number of the vehicle systems not being identified includes increasing a size of the defined area.

19. The method of claim 16, further comprising automatically communicating a request to schedule the maintenance for the candidate vehicle system to a remote controller in response to identifying the candidate vehicle system.

20. The method of claim 19, further comprising communicating the first vehicle system data to the remote controller in response to identifying the first vehicle system as the candidate vehicle system.

* * * * *